United States Patent
Kubo

(10) Patent No.: US 7,604,356 B2
(45) Date of Patent: Oct. 20, 2009

(54) PROJECTION TYPE IMAGE DISPLAY APPARATUS AND LIGHTING CIRCUIT CONTROL METHOD

(75) Inventor: Yoshio Kubo, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 11/589,211

(22) Filed: Oct. 30, 2006

(65) Prior Publication Data

US 2007/0097332 A1    May 3, 2007

(30) Foreign Application Priority Data

Oct. 31, 2005    (JP)    ............... 2005-317696

(51) Int. Cl.
G03B 21/14    (2006.01)
(52) U.S. Cl. ............... 353/84; 353/85; 348/743
(58) Field of Classification Search ............ 353/84, 353/85; 348/742, 743, 771, 7; 349/5, 7, 349/8, 9
See application file for complete search history.

(56) References Cited

U.S. PATENT DOCUMENTS

| | | | |
|---|---|---|---|
| 6,400,511 B2 * | 6/2002 | Vanlier et al. ............ | 359/634 |
| 6,520,648 B2 * | 2/2003 | Stark et al. ............... | 353/85 |
| 6,631,996 B2 * | 10/2003 | Moench et al. ........... | 353/85 |
| 7,283,181 B2 * | 10/2007 | Allen et al. .............. | 348/744 |
| 7,303,287 B2 * | 12/2007 | De Vaan ................. | 353/85 |
| 7,306,340 B2 * | 12/2007 | Nakagawa et al. ....... | 353/85 |
| 2007/0076175 A1 * | 4/2007 | Nakagawa et al. ....... | 353/85 |
| 2008/0291403 A1 * | 11/2008 | Kameta .................. | 353/84 |

FOREIGN PATENT DOCUMENTS

| | | | |
|---|---|---|---|
| JP | 2002-49097 | | 2/2002 |
| JP | 2003-102030 | | 4/2003 |
| JP | 2004-212890 | * | 7/2004 |
| JP | 2004-341445 | | 12/2004 |

* cited by examiner

Primary Examiner—William C Dowling
(74) Attorney, Agent, or Firm—Finnegan, Henderson, Farabow, Garrett & Dunner, L.L.P.

(57) ABSTRACT

One color segment is selected from among a plurality of color segments. A lamp lighting circuit is controlled so that a lamp pulse is superimposed on a DC lamp current during a time period during which a light projected from a lamp transmits through the selected color segment.

14 Claims, 3 Drawing Sheets

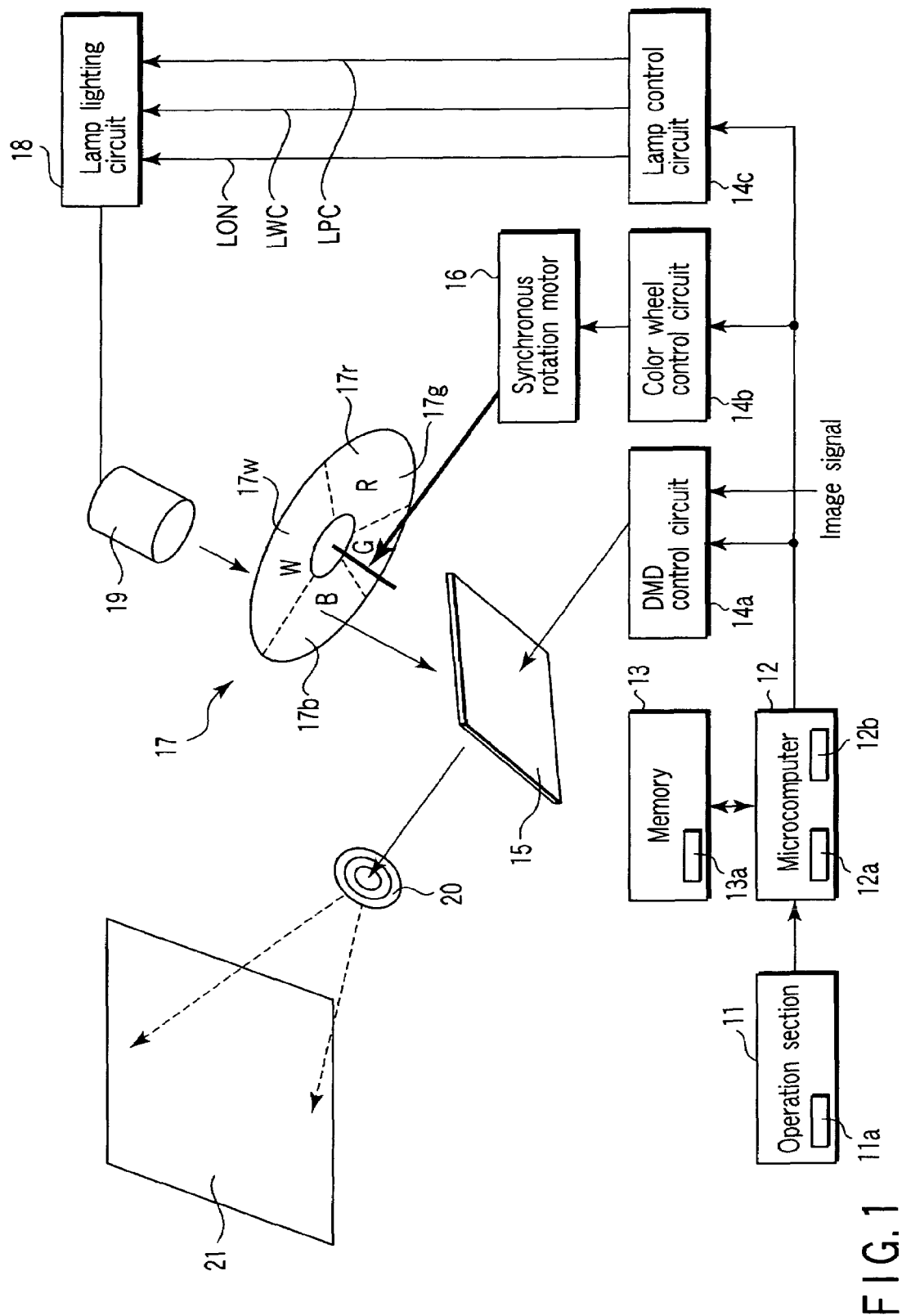
F I G. 1

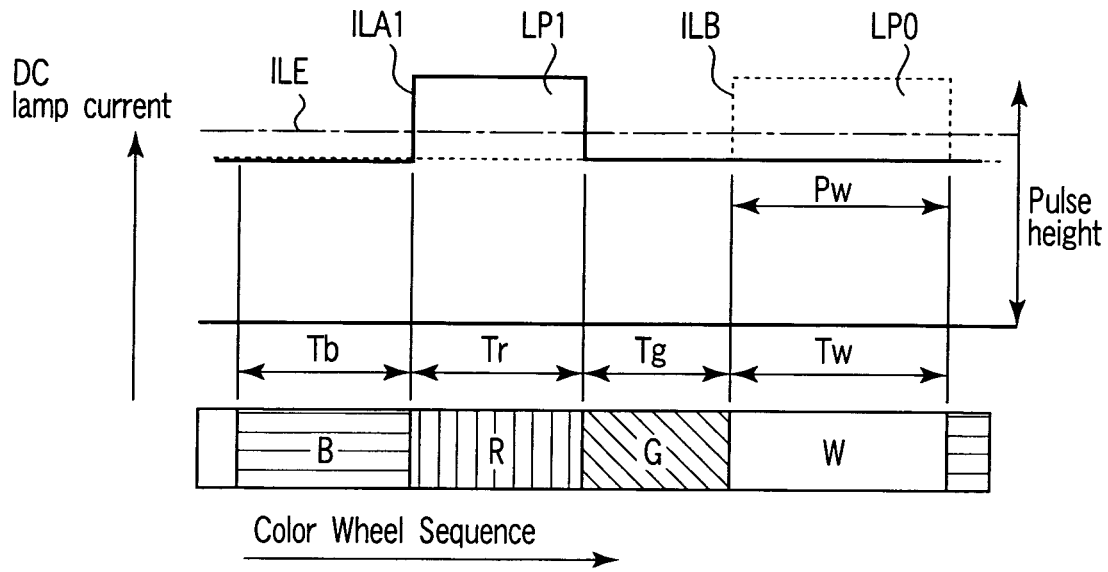
F I G. 2
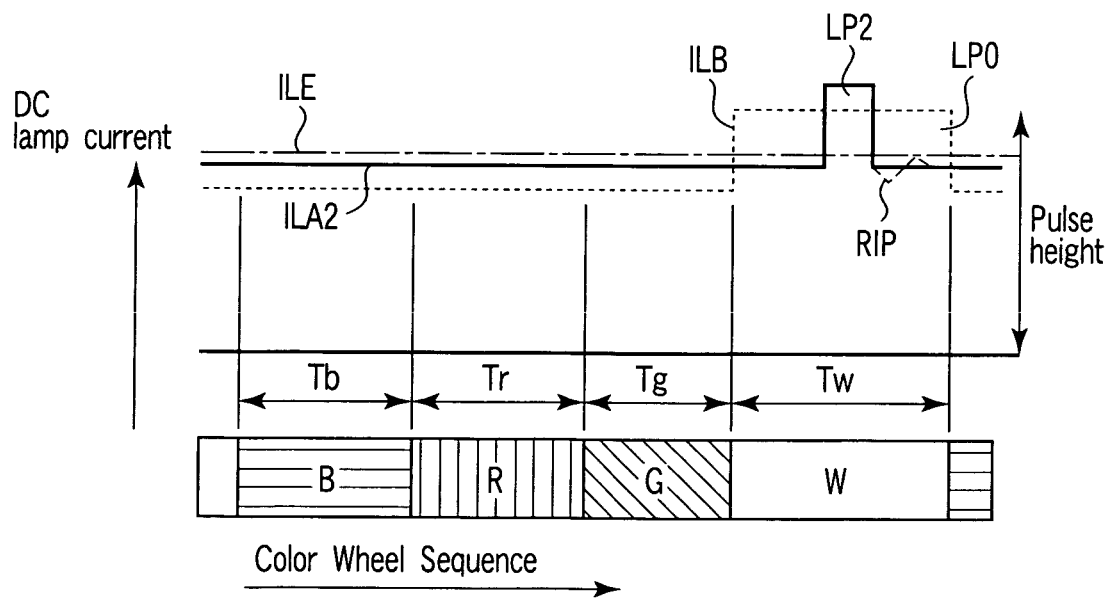
F I G. 3

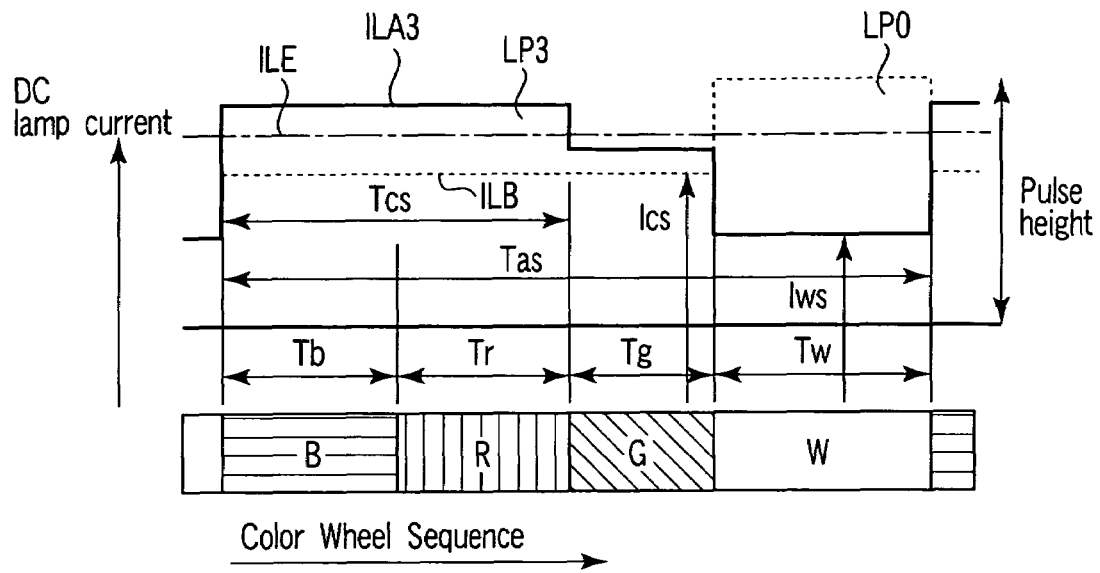
F I G. 4
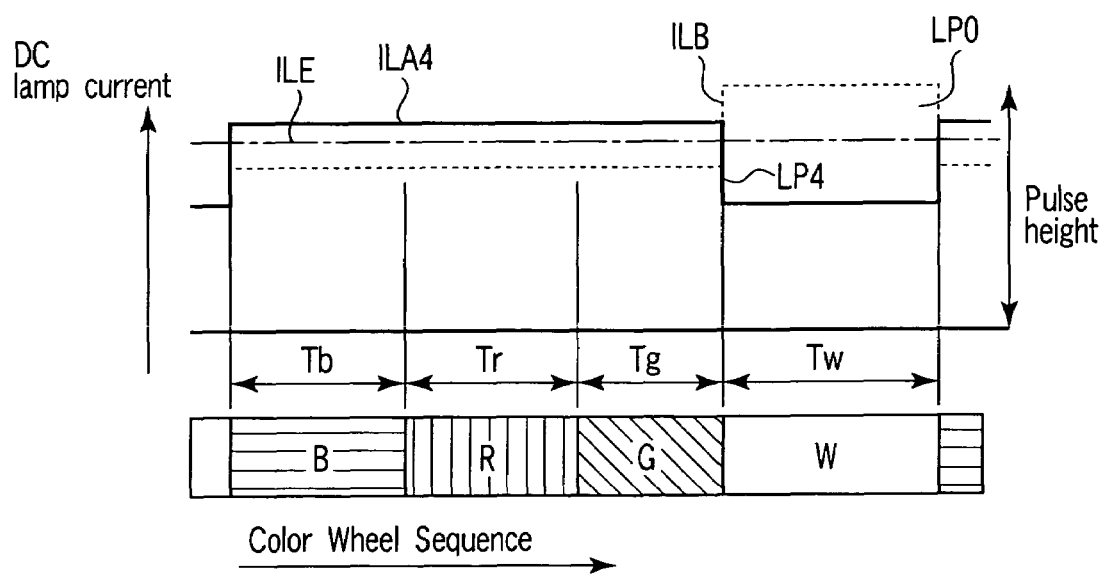
F I G. 5

PROJECTION TYPE IMAGE DISPLAY APPARATUS AND LIGHTING CIRCUIT CONTROL METHOD

CROSS-REFERENCE TO RELATED APPLICATIONS

This application is based upon and claims the benefit of priority from Japanese Patent Application No. 2005-317696, filed Oct. 31, 2005, the entire contents of which are incorporated herein by reference.

BACKGROUND

1. Field

The present invention relates to a projector which projects colored images onto a screen or the like and, more particularly, to a projector-type image display apparatus which uses a color wheel to time-divide white light into respective color lights and modulates the color lights into image lights of respective colors by means of an image display device such as a DMD so as to project the image light onto a screen.

2. Description of the Related Art

There has recently been an increased demand for enjoying images on a large-sized screen more clearly and finely and, accordingly, demand for a projector and a private-use LCD television grows rapidly. Further, high-definition digital broadcasting has started to spread, accelerating needs for high-definition images and large-sized images.

Under such circumstance, a development race for a projector using various image display devices is underway, irrespective of whether its use is business or personal, for achieving a larger-sized and clearer screen.

A projection-type image display apparatus is available as one type of the projector, which uses a color wheel including red (R), green (G), and blue (B) filters (hereinafter referred to as "color segments"), to time-divide white light emitted from a light source into the respective color lights and modulates the color lights into image lights of the respective colors by means of an image display device such as a liquid crystal panel and a digital micromirror device (DMD) so as to project the image light onto a screen.

As a light source of such a projection type image display apparatus, a high-voltage discharge lamp capable of easily obtaining high brightness is typically used. However, discharge of the high-voltage discharge lamp may become unstable in some cases to make the brightness of the image on a screen unstable, degrading the image quality. Jpn. Pat. Appln. Publication No. 2004-212890 discloses a technique which superimposes a pulse current (hereinafter, referred to as a lamp pulse) on a discharge lamp drive current while a light emitted from a discharge lamp transmits through a white segment in order to prevent flickering of a high-voltage discharge lamp. The superimposition of the lamp pulse stabilizes the discharge of the high-voltage discharge lamp.

Further, Jpn. Pat. Appln. Publication No. 2002-49097 discloses a projection-type system which changes the strength of the drive current of a discharge current such that it achieves a maximum value when a specific (desirable) color is generated to control color balance. The drive current includes a lamp pulse for making the discharge of the discharge lamp stable and the duration of the lamp pulse corresponds to the length of time for generating a white color.

However, Jpn. Pat. Appln. Publication No. 2002-49097 does not refer to a concrete configuration or method that uses the lamp pulse for preventing flickering of the discharge lamp while a light emitted from a discharge lamp transmits through a color segment to easily control the color balance of a projected image.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing a configuration example of a projection type image display apparatus according to the present invention;

FIG. 2 is a view showing a first embodiment of the current waveform of a pulse current superimposed DC lamp current according to the present invention together with a rotation sequence of a color filter;

FIG. 3 is a view showing a second embodiment of the current waveform of a pulse current superimposed DC lamp current according to the present invention together with a rotation sequence of a color filter;

FIG. 4 is a view showing a third embodiment of the current waveform of a pulse current superimposed DC lamp current according to the present invention together with a rotation sequence of a color filter; and FIG. 5 is a view showing a fourth embodiment of the current waveform of a pulse current superimposed DC lamp current according to the present invention together with a rotation sequence of a color filter.

DETAILED DESCRIPTION

Various embodiments according to the invention will be described hereinafter with reference to the accompanying drawings. In general, according to one embodiment of the invention, a projection-type image display apparatus according to an embodiment of the present invention includes: a rotatable color wheel which includes a plurality of color segments transmitting a light with different frequencies; a discharge lamp which generates a light transmitting through the color wheel; an optical element which reflects the light transmitting through the color wheel toward a screen based on an input image signal; a selection section which allows selection of one or more color segments from the plurality of color segments; a lamp lighting circuit which supplies a DC lamp current to the discharge lamp to light the discharge lamp; and a controller which controls the lamp lighting circuit so that a lamp pulse is superimposed on the DC lamp current during a time period during which a light projected from the discharge lamp transmits through one or more color segments selected by means of the selection section.

According to the projection type image display apparatus, a user can easily control the color balance of a projected image using a lamp pulse for preventing the flickering of a discharge lamp while a light from the discharge lamp transmits through a color segment (filter).

Embodiments of the present invention will now be described below with reference to the accompanying drawings.

FIG. 1 is a block diagram showing a configuration example of a projection-type image display apparatus according to the present invention.

A microcomputer 12 controls a DMD control circuit 14a, a color wheel control circuit 14b, and a lamp control circuit 14c in response to a control signal input through an operation section 11. The microcomputer 12 includes a RAM 12a and a ROM 12b and executes a control program according to the present invention stored in the ROM 12b while using the RAM 12a as a working area. A memory 13, which stores a lamp waveform, is a non-volatile memory such as a flash memory.

A lamp lighting circuit 18 supplies a drive current to a direct-current (DC) lighting lamp 19 under the control of the lamp control circuit 14c. A lamp 19 is a high-voltage discharge lamp and emits a white light. The light emitted from the lamp 19 passes through the color wheel 17, is reflected by the DMD 15, and irradiates a screen 21 through an optical system 20. The lamp lighting circuit 18 turns on/off the current supply to the lamp 19 in response to on/off of a light-on/off signal LON.

The color wheel 17 includes a red segment 17r, a green segment 17g, a blue segment 17b, and a white segment 17w and is driven by a synchronous rotation motor 16. Each of the color segments 17r, 17g, 17b, and 17w is a dichroic filter having properties of selectively passing the wavelength of, e.g., a visible light. Since the color of a light emitted from the lamp 19 is white, the white segment 17w may be a transparent filter in the present embodiment.

The synchronous rotation motor 16 rotates the color wheel 12 in synchronization with the image field of an image signal supplied to the DMD 12. The synchronous rotation motor 16 rotates the color wheel 17 at, e.g., 120 rotations per second.

Micromirrors are so arranged in the DMD 15 as to correspond to respective pixels constituting an image. Each of the micromirrors is on/off controlled in accordance with an input image signal. When, for example, the micromirrors are tuned on, the tilt thereof is adjusted so that a light emitted from the lamp 19 is reflected toward the screen 21. More specifically, while, for example, a red component image signal is being supplied to the DMD 15, micromirrors corresponding to the red component image signal is turned on and, in this state, a red color light passed through the red segment 17r irradiates the DMD 15 to allow the red component image signal to be projected onto the screen 12. The on-time duration of the respective micromirrors is determined depending on the value (pixel value) of the input image signal. The light reflected by the DMD 15 is focused onto the screen by the optical system 20.

Note that the light from the lamp 19 that irradiates a boundary between segments is not used (not reflected toward the screen 21). Further, the light from the lamp 19 that irradiates the white segment is entirely reflected toward the screen 12, which is achieved by controlling the on-time duration of the micromirrors corresponding to the input image signal supplied to the DMD 15.

A lamp lighting circuit control operation of the projection type image display apparatus according to the present invention will next be described.

A user can selectively switch display modes among a theater mode, sports scene mode, and the like by using a display mode switch section 11a of the operation section 11 constituted by menu buttons, switches, and the like while viewing, for example, a menu screen projected on the screen 21. When a switch instruction to a given display mode is input, the microcomputer 12 reads an image set value corresponding to the given display mode from an image set value table 13a stored in the memory 13. The microcomputer 12 sends to the lamp lighting circuit 18 a lamp waveform control signal LWC and lamp power control signal LPC which correspond to the image set value through the lamp control circuit 14c as well as sends to the DMD 15 a DMD control signal corresponding to the image set value through the DMD control circuit 14a, thereby changing image color balance.

The lamp waveform control signal LWC includes a synchronous signal for the color wheel 17 and a signal defining a lamp pulse width and lamp pulse height. With the lamp waveform control signal LWC, it is possible to supply a pulse current having a given width and given height to a given segment position of the color wheel 17.

The lamp power control signal LPC is a signal (e.g., a PWM signal) for correcting the lamp power which changes in accordance with the changes of the pulse width and pulse height of the lamp waveform control signal LWC thereby maintaining the lamp power at a given value.

Next, various embodiments of the lamp waveform variably controlled by the lamp control circuit 14c will be described with reference to FIGS. 2 to 5.

In the embodiments shown in FIGS. 2 to 5, a lamp pulse LP0 is made synchronous with the white segment of the color wheel 17 to obtain a lamp current waveform ILB before change (normal mode) which is a current waveform (dotted line) superimposed on almost the entire area of the white segment. The lamp pulse LP0 is generated so that the discharge of the discharge lamp 19 is made stable to thereby prevent the flickering of the image projected on the screen 21 as well as to control the brightness thereof.

In response to a user's instruction using the operation section 11, the superimposition position of the lamp pulse and width or height thereof is changed while an effective current (dashed line) ILE of the lamp, i.e., output power is being kept constant.

FIG. 2 shows a first embodiment of the lamp waveform variably controlled by the lamp control circuit 14c.

A lamp current waveform ILA1 (solid line) after the waveform change is a waveform obtained by deleting the lamp pulse LP0 which has been superposed on a DC lamp current for a time period (hereinafter, referred to merely as "transit time period") Tw during which a light from the lamp 19 transmits through the white segment 17w and superimposing the corresponding pulse on a DC lamp current during the transit time of the light through another color segment (red segment 17r, in the example of FIG. 2). A pulse width Pw of the lamp pulse LP0 that has been superimposed on a DC lamp current during the transit time of the light through the white segment 17w substantially corresponds to the transit time Tw for light transmission through the white segment 17w. The transit time period Tw for light transmission through the white segment 17w differs from the transit times Tr, Tg, and Tb for light transmission through the respective color segments 17r, 17g, and 17b. The transit times Tr, Tg, and Tb for light transmission through the respective color segments 17r, 17g, and 17b differ from one another.

In terms of a rotation angle, the transit time lengths during which a light transmits thorough the respective color segments are represented by 10° (white segment 17w), 90° (red segment 17r), 75° (green segment 17g), and 85° (blue segment 17b). Accordingly, the ratios of the transit times (Tw: Tr: Tg: Tb) are calculated to be 30: 25: 21: 24. That is, in the first embodiment, switching of the display modes is instructed through the operation section 11, the time period for light transmission through a given segment on which a lamp pulse is superimposed is switched and, accordingly, the pulse width of the lamp pulse is changed. Here, the operation section 11 functions as a segment selection section. In the example of FIG. 2, the transit time period Tw for light transmission through the segment 17w is switched to the transit time Tr for light transmission through the segment 17r. No matter which transit time period is selected, the width of a lamp pulse substantially corresponds to the transit time period of the segment on which the lamp pulse is superimposed.

The lamp effective current ILE corresponds to the rated current of the lamp 19. Maintaining the lamp current at the rated current as described above allows the capability of the lamp to be fully exploited, with the result that bright light can be obtained. Further, in FIG. 2, the lamp pulse LP1 is superimposed on the red segment 17r in place of the deletion of the lamp pulse LP0 which transmits through the white segment 17w to increase the energy of a reflected light from the color wheel 17 to the lamp 19, typically resulting in a rise in temperature of the lamp 19. However, in the present embodiment, the transit time period Tr for light transmission through the red segment 17r is shorter than the transit time Tw for light transmission through the white segment 17w, so that the lamp power is relatively reduced before and after the waveform change to thereby keep the temperature of the lamp 19 substantially constant, preventing the life of the lamp 19 from being shortened.

In the embodiment shown in FIG. 2, a red component of the image projected on the screen is increased while a white component projected thereon is decreased. By changing the lamp waveform as described above, a lamp light output transmitting through the white segment before the waveform change is divided into the light output transmitting to another color segment. As a result, the color purity (including the paucity of white component contained in the color component) of respective colors of the projected image or brightness of a given color can be increased. Note that a display mode that drives the lamp 19 by means of the lamp current on which the pulse is superimposed during the transit time of the light through the red segment 17r is herein called "theater mode". The pulse LP1 after the waveform change contributes to prevention of the flickering (stabilization of the discharge) of the lamp 19.

In the design time of the apparatus according to the present invention, when the lamp pulse is changed from the transit time for light transmission through the white segment to that for light transmission through the red segment, the red component of the projected image may excessively increase to make the color balance unfit for the corresponding display mode, in some cases. To avoid this, in the design stage, fine adjustment including color balance, γ-correction, peak value setting for each RGB color is performed at image signal level together with the change of the lamp waveform. A value of RGB signal level corresponding to each display mode which is obtained by the fine adjustment is a numeric value included in the abovementioned image set value table 13a and is stored in the memory 13. Each time a user switches the display modes, the image set value is readout from the image set value table 13a to correct an image signal supplied from the DMD control circuit to DMD 15.

FIG. 3 is a view showing a second embodiment of the lamp waveform variably controlled by the lamp control circuit 14c.

A lamp pulse LP2 of a lamp current waveform ILA2 after the waveform change has a shorter pulse width than that of the lamp pulse LP0 before the waveform change and is inserted into almost the center of the white segment transit time period Tw. At the same time, the lamp power is controlled so that it has the same value before and after the waveform change. This divides a part of a lamp light output transmitting through the white segment 17w before the waveform change into the light output transmitting to the color segments 17r, 17g, 17b. As a result, the color purity and brightness of the projected image can be increased without affecting color balance.

Hereinafter, the reason for inserting the lamp pulse LP2 of the second embodiment into almost the center of the white segment 17w transit time period will be described. The abovementioned spoke time exists in the boundaries between respective color segments 17r, 17g, 17b and 17w. A light emitted toward the color wheel during the spoke time period does not contribute to the brightness of a projected image. Therefore, it is preferable that the rise time of the lamp pulse LP2 be set to start a predetermined time after the start time of the transmit time period Tw for light transmission through the white segment 17w. Further, the lamp pulse typically includes a ripple RIP. Therefore, in order to prevent the ripple RIP from adversely affecting the intensity of a light to transmit through the next color segment (blue segment, in the example of FIG. 3), it is preferable that the fall time of the lamp pulse LP2 be set to start a predetermined time before the end of the transit time period Tw for light transmission through the white segment 17w. As described above, in order to make effective use of a light emitted from the lamp 19 as well as to prevent influence of the ripple included in the lamp pulse, the lamp pulse LP2 of the second embodiment is inserted into almost the center of the transit time period Tw for light transmission through the white segment 17w. Note that also in the present embodiment, the pulse LP2 after the waveform change contributes to prevention of the flickering (stabilization of the discharge) of the lamp 19.

FIG. 4 is a view showing a third embodiment of the lamp waveform variably controlled by the lamp control circuit 14c.

A lamp current value Iwc of a lamp current waveform ILA3 after the waveform change during the transit time period Tw for light transmission through the white segment 17w is smaller than a current value Ics of a current for a color segment before the waveform change. A light output (lamp pulse LP3) corresponding the reduction in the light output during the transit time period Tw is superimposed on a DC lamp current during the transit time periods for light transmission through a plurality of color segments (blue segment 17b and red segment 17r, in the example of FIG. 4). This enables control of color balance among RGB to increase the color purity.

A pulse width Tcs of the LP3 is set shorter than half the time period Tas (=Tas/2) for light transmission through all segments 17r, 17g, 17b, and 17w so that the flickering of the lamp 19 is prevented.

FIG. 5 is a view showing a fourth embodiment of the lamp waveform variably controlled by the lamp control circuit 14c.

A lamp pulse LP4 of a lamp current waveform ILA4 after the waveform change is superimposed on almost the entire area of the RGB color segments. This reverses the ratio between values of lamp light outputs transmitting through the white segment 17w and through the RGB segments 17r, 17g, and 17b before the waveform change. As a result, the color purity and brightness of respective colors of a projected image can be made different from those before adjustment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A projection-type image display apparatus comprising:

a rotatable color wheel which includes a plurality of color filters transmitting light of different frequencies from each other;

a discharge lamp which generates a light transmitting through the color wheel;

a lamp lighting circuit which supplies a DC lamp current to the discharge lamp to generate the light;

an image projection section which reflects the light transmitting through the color wheel toward a projection lens based on an input image signal to project an image;

a display mode selection section which selects a display mode of the image projected onto the screen; and a controller which controls the lamp lighting circuit so that a lamp pulse of a predetermined width and height is superimposed on the DC lamp current during a time period during which a light projected from the discharge lamp transmits through a specified one of the color filters of the rotatable color wheel in accordance with the display mode selected by means of the selection section, wherein, when the display mode is switched by the display mode selection section from a normal display mode to another display mode, which differs from the normal display mode at least in image color balance, a current waveform supplied to the discharge lamp is set to prevent a load on the discharge lamp from being greater than that in the normal display mode.

2. The projection-type image display apparatus according to claim 1, wherein the load on the discharge lamp includes power of the discharge lamp and energy of a reflected light from the color wheel.

3. The projection-type image display apparatus according to claim 1, wherein the display mode selection section includes an image set value table for setting γ-characteristics of the input image signal in accordance with a display mode.

4. The projection-type image display apparatus according to claim 1, wherein:

the color wheel includes a transparent filter;

a time period for transmission of the light generated from the discharge lamp through the transparent filter is longer than a time period for transmission of the light through any other one of the color filters; and in the normal display mode, a discharge lamp current flowing in the time period for transmission of light through the transparent filter is greater than a discharge lamp current flowing in the time period for transmission of light through any other one of the color filters.

5. The projection-type image display apparatus according to claim 1, wherein:

the color wheel includes a transparent filter; and when the display mode is switched from the normal display mode to said another display mode, the controller controls the lamp lighting circuit so that, during the time period for transmission of the light generated from the discharge lamp through the transparent filter, a lamp pulse having a width shorter than that of the time period for the transmission of light generated from the discharge lamp through the transparent filter is superimposed on the DC lamp current.

6. The projection-type image display apparatus according to claim 1, wherein:

the color wheel includes a transparent filter; and when the display mode is switched from the normal display mode to said another display mode, the controller controls the lamp lighting circuit so that, during the time period for transmission of the light generated from the discharge lamp through the transparent filter, a discharge lamp current is reduced and a lamp pulse having a width corresponding to the time period for transmission of the light generated from the discharge lamp through a plurality of color filters is superimposed on the DC lamp current, the width of the lamp pulse to be superimposed being shorter than half a time period in which the color wheel makes one rotation.

7. The projection-type image display apparatus according to claim 1, wherein:

the color wheel includes a transparent filter; and when the display mode is switched from the normal display mode to said another display mode, the controller controls the lamp lighting circuit so that, during the time period for transmission of the light generated from the discharge lamp through all the color filters, a lamp pulse is superimposed on the DC lamp current, and a discharge lamp current flowing in the time period for transmission of light through the transparent filter after switching is smaller than a discharge lamp current flowing in the time period for transmission of light through any other one of the color filters in the normal display mode.

8. A method for controlling a lamp lighting circuit of a projection-type image display apparatus, including a lamp lighting circuit which supplies a DC lamp current to the discharge lamp to light the discharge lamp, the method comprising:

selecting a display mode of an image projected onto a screen; and controlling the lamp lighting circuit so that a lamp pulse of a predetermined width and height is superimposed on the DC lamp current during a time period during which a light projected from the discharge lamp transmits through a specified one of the color filters of the rotatable color wheel in accordance with the selected display mode, wherein, when the display mode is switched from a normal display mode to another display mode, which differs from the normal display mode at least in image color balance, a current waveform supplied to the discharge lamp is set to prevent a load on the discharge lamp from being greater than that in the normal display mode.

9. The method for controlling a lamp lighting circuit according to claim 8, wherein the load on the discharge lamp includes power of the discharge lamp and energy of a reflected light from the color wheel.

10. The method for controlling a lamp lighting circuit according to claim 8, wherein selecting a display mode includes changing γ-characteristics of an input image signal in accordance with a selected display mode.

11. The method for controlling a lamp lighting circuit according to claim 8, wherein:

the color wheel includes a transparent filter;

a time period for transmission of the light generated from the discharge lamp through the transparent filter is longer than a time period for transmission of the light through any other one of the color filters; and in the normal display mode, a discharge lamp current flowing in the time period for transmission of light through the transparent filter is greater than a discharge lamp current flowing in the time period for transmission of light through any other one of the color filters.

12. The method for controlling a lamp lighting circuit according to claim 8, wherein:

the color wheel includes a transparent filter; and when the display mode is switched from the normal display mode to said another display mode, the lamp lighting circuit is controlled so that, during the time period for transmission of the light generated from the discharge lamp through the transparent filter, a lamp pulse having a width shorter than that of the time period for transmission of the light generated from the discharge lamp through the transparent filter is superimposed on the DC lamp current.

13. The method for controlling a lamp lighting circuit according to claim 8, wherein:

the color wheel includes a transparent filter; and when the display mode is switched from the normal display mode to said another display mode, the lamp lighting circuit is controlled so that, during the time period for transmission of the light generated from the discharge lamp through the transparent filter, a discharge lamp current is reduced and a lamp pulse having a width corresponding to the time period for transmission of the light generated from the discharge lamp through a plurality of color filters is superimposed on the DC lamp current, the width of the lamp pulse to be superimposed being shorter than half a time period in which the color wheel makes one rotation.

14. The method for controlling a lamp lighting circuit according to claim 8, wherein:

the color wheel includes a transparent filter; and when the display mode is switched from the normal display mode to said another display mode, the lamp lighting circuit is controlled so that, during the time period for transmission of the light generated from the discharge lamp through all the color filters, a lamp pulse is superimposed on the DC lamp current, and a discharge lamp current flowing in the time period for transmission of light through the transparent filter after switching is smaller than a discharge lamp current flowing in the time period for transmission of light through any other one of the color filters in the normal display mode.

* * * * *